United States Patent
Yamamuro et al.

(10) Patent No.: US 12,179,467 B2
(45) Date of Patent: Dec. 31, 2024

(54) COMPOSITE SOUND-ABSORBING MATERIAL

(71) Applicant: Asahi Kasei Kabushiki Kaisha, Tokyo (JP)

(72) Inventors: Shinya Yamamuro, Tokyo (JP); Chie Okamura, Tokyo (JP); Yasuo Nakanishi, Tokyo (JP); Takashi Komatsu, Tokyo (JP); Eiji Shiota, Tokyo (JP)

(73) Assignee: Mitsui Chemicals Asahi Life Materials Co., Ltd., Tokyo (JP)

( * ) Notice: Subject to any disclaimer, the term of this patent is extended or adjusted under 35 U.S.C. 154(b) by 38 days.

(21) Appl. No.: 17/918,218

(22) PCT Filed: May 18, 2021

(86) PCT No.: PCT/JP2021/018842
§ 371 (c)(1),
(2) Date: Oct. 11, 2022

(87) PCT Pub. No.: WO2021/235446
PCT Pub. Date: Nov. 25, 2021

(65) Prior Publication Data
US 2023/0147834 A1 May 11, 2023

(30) Foreign Application Priority Data
May 19, 2020 (JP) .................. 2020-087357

(51) Int. Cl.
*B32B 5/02* (2006.01)
*B32B 5/24* (2006.01)
*B32B 5/26* (2006.01)
*B32B 37/10* (2006.01)

(52) U.S. Cl.
CPC .............. *B32B 5/022* (2013.01); *B32B 5/245* (2013.01); *B32B 5/265* (2021.05); *B32B 37/10* (2013.01); *B32B 2250/02* (2013.01); *B32B 2260/021* (2013.01); *B32B 2260/046* (2013.01); *B32B 2305/022* (2013.01); *B32B 2305/026* (2013.01); *B32B 2305/18* (2013.01); *B32B 2305/30* (2013.01); *B32B 2307/102* (2013.01)

(58) Field of Classification Search
None
See application file for complete search history.

(56) References Cited

U.S. PATENT DOCUMENTS

| 2017/0200441 A1 | 7/2017 | Mohammadi Gojani et al. |
| 2020/0316906 A1 | 10/2020 | Yamamuro et al. |
| 2021/0094258 A1 | 4/2021 | Hattori et al. |

FOREIGN PATENT DOCUMENTS

| JP | 2002-161464 A | | 6/2002 | |
| JP | 2006-028708 A | | 2/2006 | |
| JP | 2006098890 A | * | 4/2006 | |
| JP | 2015-121631 A | | 7/2015 | |
| JP | 2018-199374 A | | 12/2018 | |
| JP | 2019-045636 A | | 3/2019 | |
| WO | WO-2019124231 A1 | * | 6/2019 | ............ B32B 5/022 |
| WO | 2019/172016 A1 | | 9/2019 | |

OTHER PUBLICATIONS

Yamamuro, S., Nonwoven Fabric and Sound Absorbing Material, Jun. 27, 2019, machine translation of WO2019124231 (Year: 2019).*
Narita, S., Sound Deadening Material, Apr. 13, 2006, machine translation of JP2006-098890 (Year: 2009).*
Supplementary European Search Report issued in European Patent Application No. 21808579.3 dated Oct. 10, 2023.
International Search Report issued in corresponding International Patent Application No. PCT/JP2021/018842 dated Jul. 27, 2021.
International Preliminary Report on Patentability and Written Opinion issued in corresponding International Patent Application No. PCT/JP2021/018842 dated Dec. 1, 2022.

* cited by examiner

*Primary Examiner* — Chinessa T. Golden
(74) *Attorney, Agent, or Firm* — Morgan, Lewis & Bockius LLP

(57) ABSTRACT

Provided is a composite sound-absorbing material that can exhibit sound absorption properties in a broad range of low frequencies, intermediate frequencies, and high frequencies even in a low-basis-weight region having low thickness. The composite sound-absorbing material according to the present invention is configured from two or more layers including a base material and a skin material, the skin material being positioned on the outermost layer, wherein the composite sound-absorbing material is characterized in that the ratio (skin material:base material) of the surface area ($m^2/m^2$) per unit area of the skin material and the surface area ($m^2/m^2$) per unit area of the base material is at least 1:5 and less than 1:40.

13 Claims, No Drawings

COMPOSITE SOUND-ABSORBING MATERIAL

FIELD

The present invention relates to a composite sound-absorbing material comprising two or more layers including a base material and a skin material.

BACKGROUND

Traveling vehicles produce various kinds of noise including noise from engines and drive systems mounted in the vehicles, road noise from traveling, and wind noise. In order to avoid discomfort to passengers by such noise, sound-absorbing materials are applied as anti-noise measures on the wall faces of engine hoods, dash panels, ceiling materials, door trimmings and cab floors. In PTL 1, for example, there is proposed a multilayer structure comprising a sound-absorbing material made of a porous material such as a nonwoven fabric or resin foam as the sound-absorbing material, and a skin layer (also referred to as skin material, surface material or skin), such as a nonwoven fabric or resin film whose air permeability is controlled to a fixed range, layered in an integral manner on the sound-absorbing material as the base material.

PTL 2 proposes a sound-absorbing material comprising a nonwoven fabric surface material made of a layered nonwoven fabric with a melt-blown ultrafine fiber layer and a synthetic long fiber layer integrated by thermocompression bonding, and a synthetic fiber nonwoven fabric back material with a coarse structure at a bulk density of 0.005 to 0.15 g/cm$^3$, but the synthetic fiber nonwoven fabric on the surface also has a significant effect, making it unable to provide absorption of sound in a wide frequency range.

In PTL 3 there is proposed a nonwoven fabric with excellent moldability, comprising a melt-blown ultrafine fiber layer and a spunbond nonwoven base fabric-added staple fiber nonwoven fabric, layered in an integral manner by a mechanical interlacing method, but because it is layered in an integral manner by mechanical interlacing, it has a large nonwoven fabric thickness which is disadvantageous from the viewpoint of occupying less space as a vehicle member. Another drawback is that the sound absorption property is poor since mechanical interlacing produces holes through which sound can permeate.

In PTL 4, a composite sound-absorbing material is described which includes at least two fiber layers having pore sizes with a specified average flow, and controlled air permeability, and with a base material layer disposed between them. However, a 5 mm rear air layer is provided when measuring the sound absorption coefficient, utilizing the sound absorption effect that occurs when permeated reflected sound reenters into the back side fiber layer, and therefore the actual thickness is large. It is also difficult to provide a rear air layer when it is installed on the wall face of a vehicle.

Sound-absorbing materials comprising skin materials in combination with sound-absorbing base materials have thus been proposed, but sound-absorbing materials having small thickness and low basis weight, and absorbing a wide range of sound frequencies, have been difficult to achieve from the viewpoint of air permeability alone, and in order to obtain sufficient sound absorption performance it has been necessary to increase thickness using air from behind.

CITATION LIST

Patent Literature

[PTL 1] Japanese Unexamined Patent Publication No. 2015-121631
[PTL 2] Japanese Unexamined Patent Publication No. 2006-028708
[PTL 3] Japanese Unexamined Patent Publication No. 2002-161464
[PTL 4] International Patent Publication No. WO2019/172016

SUMMARY

Technical Problem

In light of the prior art, the problem to be solved by the invention is to provide a composite sound-absorbing material which has a small thickness and is able to exhibit a sound absorption property across a wide range including low frequency, mid frequency and high frequency, even in low-basis-weight regions.

Solution to Problem

As a result of much research conducted with the goal of solving the problem described above, the present inventors have completed this invention upon finding that a composite sound-absorbing material composed of at least two layers, including a base material and a skin material, has excellent space reduction and light weight while also exhibiting an excellent sound absorption property across a wide range including low frequency, mid frequency and high frequency, if the ratio of the surface area of the base material per unit area and the surface area of the skin material per unit area is within a specified range.

Specifically, the present invention is as follows.

[1] A composite sound-absorbing material composed of two or more layers including a base material and a skin material in which the skin material is disposed on the outermost layer, wherein the ratio of the surface area of the skin material per unit area (m$^2$/m$^2$) and the surface area of the base material per unit area (m$^2$/m$^2$) (skin material:base material) is at least 1:5 and less than 1:40.

[2] The composite sound-absorbing material according to [1] above, wherein the ratio of the surface area of the skin material per unit area (m$^2$/m$^2$) and the surface area of the base material per unit area (m$^2$/m$^2$) (skin material:base material) is from 1:10 to 1:35.

[3] The composite sound-absorbing material according to [1] or [2] above, wherein the surface area of the skin material per unit area is 10 m$^2$/m$^2$ to 20 m$^2$/m$^2$.

[4] The composite sound-absorbing material according to any one of [1] to [3] above, wherein the surface area of the base material per unit area is 100 m$^2$/m$^2$ to 500 m$^2$/m$^2$.

[5] The composite sound-absorbing material according to any one of [1] to [4] above, wherein the thickness is 40 mm or smaller.

[6] The composite sound-absorbing material according to any one of [1] to [5] above, wherein the basis weight of the skin material is 25 g/m$^2$ to 70 g/m$^2$.

[7] The composite sound-absorbing material according to any one of [1] to [6] above, wherein the skin material is a nonwoven fabric integrated by thermocompression bonding.

[8] The composite sound-absorbing material according to [7] above, wherein the thermocompression bonding is partial thermocompression bonding.

[9] The composite sound-absorbing material according to any one of [1] to [8] above, wherein the skin material is a nonwoven fabric in which at least one ultrafine fiber layer (M) with a mean fiber size of 0.3 µm to 7 µm and at least one thick fiber layer (S) with a mean fiber size of 10 µm to 30 µm are integrated.

[10] The composite sound-absorbing material according to [9] above, wherein the basis weight of the ultrafine fiber layer (M) of the skin material is 1 g/m$^2$ to 40 g/m$^2$.

[11] The composite sound-absorbing material according to any one of [1] to [10] above, wherein the skin material comprises a filler that includes a synthetic resin at a content of 3 g/m$^2$ to 20 g/m$^2$.

[12] The composite sound-absorbing material according to any one of [1] to [11] above, wherein the base material is an open-cell resin foam.

[13] The composite sound-absorbing material according to any one of [1] to [11] above, wherein the base material is a fiber porous material.

[14] The composite sound-absorbing material according to any one of [1] to [13] above, wherein at least one layer of the skin material is disposed on the sound source side.

[15] The composite sound-absorbing material according to any one of [1] to [14] above, which has a sound absorption coefficient of 30% or greater at a frequency of 1000 Hz, a sound absorption coefficient of 90% or greater at 2500 Hz and a sound absorption coefficient of 80% or greater at 5000 Hz, for sound impinging from the skin material side as measured for normal incidence according to JIS A 1405.

Advantageous Effects of Invention

The composite sound-absorbing material of the invention has a small thickness and light weight, while also exhibiting an excellent sound absorption property across a wide range including low frequency, mid frequency and high frequency, and therefore it is particularly suitable for use as a skin material for a moldable composite sound-absorbing material in vehicles, domiciles, household electrical appliances and construction equipment.

DESCRIPTION OF EMBODIMENTS

An embodiment of the invention will now be described in detail.

The composite sound-absorbing material according to one embodiment is composed of two or more layers including a base material and a skin material in which the skin material is disposed on the outermost layer, wherein the ratio of the surface area of the skin material per unit area (m$^2$/m$^2$) and the surface area of the base material per unit area (m$^2$/m$^2$) (skin material:base material) is at least 1:5 and less than 1:40.

By exhibiting effects on both sides, i.e. a porous sound absorption effect and a plane vibration sound absorption effect, the composite sound-absorbing material of the embodiment exhibits a sound absorption effect across a wide range including low frequency, mid frequency and high frequency. The porous sound absorption effect is an effect of converting vibrational sound energy to thermal energy by friction with a lattice, and it is effective for the high frequency range. The plane vibration sound absorption effect is an effect of converting vibrational sound energy to thermal energy by friction of the base material with the lattice that is produced when sound enters the dense structure and the entire surface vibrates by the received vibrational sound energy, whereby air in the base material behind the surface acts as a spring to more efficiently cause vibration of air in the base material, and this effect is effective for the low frequency range.

A composite sound-absorbing material does not generally exhibit satisfactory sound absorption performance if a skin material and base material with good sound absorption performance are simply combined, but a more excellent sound absorption property can be obtained if each is optimized from the viewpoint of easier infiltration of sound and easier friction with air.

The skin material of the composite sound-absorbing material of the embodiment is not particularly restricted so long as it is a fabric, and it may be a woven fabric, knitted fabric or nonwoven fabric, though preferably a nonwoven fabric. The skin material may comprise a filler containing, in addition to the fabric, a synthetic resin on the surface and/or in the voids of the fabric (hereunder also referred to simply as "filler").

The ratio of the surface area of the skin material per unit area (m$^2$/m$^2$) to the surface area of the base material per unit area (m$^2$/m$^2$) (skin material:base material) in the composite sound-absorbing material of the embodiment is at least 1:5 and less than 1:40, preferably 1:10 to 1:35 and more preferably 1:10 to 1:30. If the ratio is 1:5 or greater, the surface area contributing to friction between the base material and air will increase when surface vibration of the skin material is transmitted to air in the base material, allowing more efficient conversion of vibrational energy to thermal energy, while reflection of sound at the skin material will also tend to be inhibited, thus more easily exhibiting improved sound absorption performance. If the ratio is less than 1:40, on the other hand, it will be less likely for the skin material and base material to have an excessive density gradient or for penetration of sound over the entire area in the thickness direction of the base material to be inhibited, making it possible to obtain sufficient sound absorption performance even with a small thickness. By thus adjusting the ratio of the skin material and the surface area of the base material per unit area, it is possible to contribute to sound absorption over the entire area in the thickness direction and to obtain a composite sound-absorbing material with small thickness and light weight. When the skin material includes a filler, the surface area of the skin material per unit area forming the composite sound-absorbing material of this embodiment represents the total surface area of the skin material comprising the fabric and filler.

From the viewpoint of exhibiting the porous sound absorption effect and plane vibration sound absorption effect on both sides, the surface area of the skin material per unit area forming the composite sound-absorbing material of this embodiment is preferably 10 to 20 m$^2$/m$^2$, more preferably 11 to 19 m$^2$/m$^2$ and even more preferably 12 to 18 m$^2$/m$^2$. If the value is 10 m$^2$/m$^2$ or greater, a porous sound absorption effect and plane vibration sound absorption effect will be exhibited on both sides, allowing a sound absorption effect to be exhibited across a wide range including low frequency, mid frequency and high frequency. If the value is 20 m$^2$/m$^2$ or lower, it will be possible to prevent an excessively dense structure from forming, thus reducing reflection and facilitating penetration of sound to the base material and allowing a sound absorption effect to be easily obtained over the entire composite sound-absorbing material.

Since the fiber size and fiber weight significantly contribute to the surface area per unit area, the surface area per unit area can be adjusted by setting optimal ranges for the fiber size and fiber weight. When a spunbond nonwoven fabric is used as the skin material, however, a high basis weight tends to result if the surface area per unit area is limited to the preferred range specified above, and therefore increasing the surface area with a filling material containing a filler or pigment, or adding ultrafine fibers, will help to reduce the thickness and lower the weight. It is also a preferred mode to use ultrafine fibers alone for the skin material without using a spunbond nonwoven fabric. However, ultrafine fibers produced by melt blowing tend to have a high degree of fusion between filaments, making it difficult to significantly improve the unit surface area even if the mean fiber size is reduced. It is therefore extremely important to set the spinning conditions including the resin viscosity, spinning temperature and blast distance during spinning of ultrafine fibers, as described below.

The surface area per unit area of the base material composing the composite sound-absorbing material of the embodiment is preferably 100 to 500 $m^2/m^2$, more preferably 150 to 450 $m^2/m^2$ and even more preferably 200 to 400 $m^2/m^2$, from the viewpoint of having a satisfactory sound absorption effect while converting sound to thermal energy over the entire area in the thickness direction, and also sufficiently exhibiting the sound absorption effect of the skin material. If the value is 100 $m^2/m^2$ or greater, this will increase the area in which vibrational sound energy is converted to thermal energy by friction with the lattice, which is necessary for the porous sound absorption effect, thus helping to provide an adequate sound absorption effect and allowing the sound absorption effect to be exhibited over a wide range including low frequency and mid frequency and, especially, high frequency. If the value is 500 $m^2/m^2$ or lower it will be possible to prevent an excessively dense structure from forming, thus reducing reflection of mid- to high-frequency sound, facilitating penetration of sound to the base material, and inhibiting reduction in the sound absorption coefficient for mid- to high-frequency sound.

The thickness of the composite sound-absorbing material of the embodiment is preferably 5 to 40 mm and more preferably 7 to 30 mm. If the thickness is 5 to 40 mm, the sound-absorbing material will have a small thickness and light weight, and a high sound absorption effect will be obtained throughout a relatively wide range of frequencies.

The basis weight of the skin material in the composite sound-absorbing material of the embodiment is preferably 25 to 70 $g/m^2$ and more preferably 27 to 60 $g/m^2$. If the basis weight of the skin material is 25 $g/m^2$ or greater it will be possible to adequately control air permeation through the skin layer, and to more easily obtain a sufficient surface area per unit area. The strength necessary to protect from abrasion with the base material can also be more easily obtained, and from a design standpoint, it will be easier to provide a screen over the base material. If the basis weight of the skin material is 70 $g/m^2$ or lower, it will be possible to prevent an excessively dense structure from forming, thus reducing reflection and facilitating penetration of sound to the base material and allowing a sound absorption effect to be easily obtained over the entire composite sound-absorbing material. It will also be easier to obtain flexibility, stretchability and a shape-following property for the skin material, for greater usability even for members that require thermoforming, such as hood insulators, for which such properties are essential.

The method of integrating the skin material forming the composite sound-absorbing material of the embodiment is preferably a method of integration by thermocompression bonding, integration by application of an adhesive resin onto the web obtained by carding, or integration by mechanical entangling using needle punching or hydroentangling, but integration by thermocompression bonding is preferred from the viewpoint of the sound absorption property and obtaining a light weight. A skin material integrated by thermocompression bonding will have the skin material appropriately immobilized as a surface, thus helping to exhibit a film vibration sound absorption effect and providing adequate strength, which will also result in satisfactory handleability.

When the skin material forming the composite sound-absorbing material of the embodiment is integrated by thermocompression bonding, the thermocompression bonding may be joining by thermocompression bonding between a known embossing roll and smooth roll (hereunder also referred to as "flat roll"), joining by thermocompression bonding between a smooth roll and smooth roll, or joining by thermocompression bonding between hot flat plates. Most preferred is a method of joining by thermocompression bonding between an embossing roll and a smooth roll, which makes it possible to inhibit densification at the non (partially)-thermocompression bonded sections (also considered to be non-embossed sections in this method) so as to reduce inhibition against penetration of sound. Moreover, since firm integration is achieved at the (partial) thermocompression bonded sections (considered to be the same as embossed sections in this method), sufficient strength is exhibited, resulting in satisfactory handleability and allowing use for members that require thermoforming, for greater suitability for a wider range of applications.

For a method of joining by thermocompression bonding between an embossing roll and smooth roll, preferably the partial thermocompression bonding is carried out with a contact bonding area ratio in the range of 6% to 30% and more preferably 7% to 25%, with respect to the total area of the nonwoven fabric. If the thermocompression bonding area ratio is 6% or greater, generation of fluff will be reduced, and if it is 30% or lower, the nonwoven fabric will be unlikely to have a paper-like quality and the mechanical properties such as breaking elongation and tearing strength will be unlikely to be impaired. If the contact bonding area ratio is within this range it will be possible to satisfactorily carry out thermocompression bonding between the fibers, and a nonwoven fabric with suitable mechanical strength, rigidity and dimensional stability can be obtained.

The temperature during thermocompression bonding cannot be specified for all cases as it should be appropriately selected depending on conditions such as the basis weight and speed of the supplied web, but it is preferably a temperature of 30° C. to 90° C. lower, and more preferably 40° C. to 70° C. lower, than the melting point of the resin forming the fibers. When joining is by heating and contact bonding between an embossing roll and smooth roll, and the type of resin contacting with the embossing roll surface and the type of resin contacting with the flat roll surface are the same, the temperature difference between the embossing roll and the flat roll is preferably less than 10° C., more preferably less than 5° C. and even more preferably less than 3° C. This does not apply, however, when the melting points of the resin contacting with the embossing roll surface and the resin contacting with the flat roll surface are different, or when the spinning speeds or yarn orientations and crystallinity are different. If the temperature difference between the embossing roll and flat roll is within the aforementioned specified range, fluff will be unlikely to be generated on the roll with the lower temperature, fluff generation caused by molded shaping can also be inhibited, the yarn will be unlikely to separate from the thermocompression bonded sections due to fluff when stretching takes place during the molding, and stress will be unlikely to concentrate at sections where yarn has separated, thus helping to reduce stretch marks and inhibiting exposure of the sound-absorbing base material. If the temperature difference is not excessively large, then heat resistance defects due to a lack of heat on one side will be unlikely to occur. When a difference in roll temperatures exists, the stress can be reduced during stretching to improve the moldability.

The pressure during thermocompression bonding likewise cannot be specified for all cases as it should be appropriately selected depending on conditions such as the basis weight and speed of the supplied web, but it is preferably 10 N/mm to 100 N/mm and more preferably 30 N/mm to 70 N/mm, as this range will allow satisfactory thermocompression bonding to be carried out between the fibers, and can yield a nonwoven fabric with suitable mechanical strength, rigidity and dimensional stability.

The shapes of the thermocompression bonded sections are not particularly restricted, but preferred examples are a texture pattern, IL pattern (rectangular), pinpoint pattern, diamond pattern, quadrilateral pattern, hexagonal pattern, elliptical pattern, lattice pattern, polka dot pattern or round pattern.

Since pressure is exerted over the entire nonwoven fabric surface when joining is by thermocompression bonding between a smooth roll and smooth roll, or when joining is by thermocompression bonding between thermal plates, the thermocompression bonding is preferably at low pressure and low temperature, so as to avoid excessive denseness in the surface as a whole that will inhibit penetration of sound, but to an extent that will not cause interlayer separation.

The skin material forming the composite sound-absorbing material of the embodiment is preferably composed of at least one thick fiber layer (S), at least one ultrafine fiber layer (M), or a complex of at least one thick fiber layer (S) and at least one ultrafine fiber layer (M). For example, the structure may be S or SS when it is composed of at least one thick fiber layer (S), M or MM when it is composed of at least one ultrafine fiber layer (M), or SM, SMS, SMM, SMMS, SMSMS or SMSSMS when it is composed of a complex of at least one thick fiber layer (S) and at least one ultrafine fiber layer (M).

When it is composed of a single thick fiber layer (S) it will have high strength and excellent handleability, but in order to improve the air permeability for the skin material necessary for exhibiting a sound absorption effect, and the surface area per unit area, it is preferred to add a filler to increase the density.

When it is composed of a single ultrafine fiber layer (M) it will be easier to produce air permeability for the skin material necessary for exhibiting a sound absorption effect and to obtain a sufficient surface area per unit area, but in order to obtain satisfactory handleability and prevent tearing of the fabric during the thermocompression bonding step, it is preferred to carry out thermocompression bonding at low speed and use a fiber size of about 3 to 7 µm.

A particularly preferred construction is one composed of a complex of a thick fiber layer (S) and ultrafine fiber layer (M), to obtain properties from both the thick fiber layer (S) alone and the ultrafine fiber layer (M) alone. That is, both sound absorption properties and handleability can be obtained with a low basis weight by using extremely fine ultrafine fibers, without adding a filler.

When the skin material forming the composite sound-absorbing material of the embodiment is composed a complex of a thick fiber layer (S) and an ultrafine fiber layer (M), it is preferably a nonwoven fabric in which at least one ultrafine fiber layer (M) with a mean fiber size of 0.3 µm to 7 µm and at least one thick fiber layer (S) with a mean fiber size of 10 µm to 30 µm are integrated. This will allow both a sound absorption effect and handleability to be achieved. In addition, by layering an ultrafine fiber layer (M) that is prone to being torn during casting with a high-strength thick fiber layer (S) and integrating them by thermocompression bonding, for example, the main function of the thick fiber layer (S) will be exhibited during stretching without producing extreme stress on the ultrafine fiber layer (M), thus making it easier to achieve uniform stretching without tearing of the ultrafine fiber layer (M).

When the skin material forming the composite sound-absorbing material of the embodiment includes a thick fiber layer (S), the thick fiber layer (S) is preferably composed of continuous long fibers, and the spinning method is preferably a known spunbond method, with the preferred conditions being uniform dispersion of the yarn by frictional electrification or corona electrification during spinning. By employing such conditions it is easier to create a web in an unbonded state and to achieve excellent economy. The web of the thick fiber layer may be either a single layer or a stack of multiple layers.

The material forming the thick fiber layer (S) is preferably a thermoplastic synthetic resin with which fibers can be formed by melt spinning. Examples of thermoplastic synthetic resins include polyolefin-based resins (such as polyethylene, polypropylene and copolymerized polypropylene), aromatic polyester-based resins, aliphatic polyester-based resins (such as poly D-lactic acid, poly L-lactic acid, copolymers of D-lactic acid and L-lactic acid, copolymers of D-lactic acid and hydroxycarboxylic acid, copolymers of L-lactic acid and hydroxycarboxylic acid, copolymers of D-lactic acid, L-lactic acid and hydroxycarboxylic acid, and blends of the foregoing), polyamide-based resins (such as polyamide 6, polyamide 66 and copolymerized polyamide), and polyphenylene sulfide. For the thermoplastic synthetic resin it is particularly preferred to use aromatic polyester-based resins, which have excellent heat resistance and water resistance. An aromatic polyester-based resin is a thermoplastic polyester, typical examples of which are polyethylene terephthalate (PET), polybutylene terephthalate and polytrimethylene terephthalate. The aromatic polyester-based resin may also be a polyester obtained by polymerization or copolymerization of isophthalic acid or phthalic acid as an ester-forming acid component.

The thick fiber layer (S) of the nonwoven fabric in contact with the base material of the composite sound-absorbing material may also include fibers having a melting point of at least 30° C. lower than the melting point of the fibers of the other layers. That is, in order to maintain satisfactory adhesion between the nonwoven fabric surface material and the base material, the layer that contacts with the base material may have a fiber structure with a low melting point. Examples of low melting point fibers include polyester-based fibers such as aromatic polyester copolymers obtained by copolymerizing one or more compounds from among phthalic acid, isophthalic acid, sebacic acid, adipic acid, diethylene glycol and 1,4-butanediol, with polyethylene terephthalate, or aliphatic esters. Such fibers may be used alone or as composite mixed fibers with two or more types, or they may be composite mixed fibers comprising low melting point fibers and high melting point fibers. Composite fibers with a sheath-core structure, having a low melting point component as the sheath, may also be used. Examples of composite fibers with a sheath-core structure include polyethylene terephthalate, polybutylene terephthalate and copolymerized polyesters with a high-melting-point component as the core, and copolymerized polyesters and aliphatic esters with a low-melting-point component as the sheath.

The mean fiber size of the fibers composing the thick fiber layer (S) is preferably 10.0 μm to 30.0 μm, more preferably 12.0 μm to 30.0 μm, even more preferably 12.0 μm to 20.0 μm, yet more preferably 13.0 μm to 20.0 μm and most preferably 13.0 μm to 18.0 μm. It is 10.0 μm or larger from the viewpoint of spinning stability, and 30 μm or smaller from the viewpoint of strength and heat resistance. If the mean fiber size of the fibers is within the specified range, the crystallinity of the fibers will not be excessively high, they will have fewer crystal portions, the ductility of the fibers will increase, the moldability will tend to be satisfactory, heat shrinkage will be less likely to occur during partial thermocompression bonding, and the fibers will be unlikely to melt by the heat of the thermocompression bonding roll or to be taken up by the roll, and therefore the productivity of the nonwoven fabric will be satisfactory, the covering property will improve, the nonwoven fabric strength will increase and the spinning stability will be satisfactory.

When the skin material forming the composite sound-absorbing material of the embodiment includes an ultrafine fiber layer (M), the ultrafine fiber layer (M) is preferably produced by a melt blowing method. In melt blowing, a molten resin is discharged from a spinning nozzle and immediately attracted by air flowing at high temperature and high speed, thereby relatively lowering production cost and helping to produce narrow fiber sizes. However, the molten and discharged resin is difficult to solidify due to the nature of the production method, and fusion between the fibers often makes it impossible to obtain sufficient surface area. In order to prevent fusion between the fibers, therefore, it is preferred to appropriately adjust the resin viscosity or the blasting distance onto the conveyor or thick fiber layer (S).

When the material of the ultrafine fiber layer (M) is PET or a copolymer thereof, the solution viscosity (ηsp/c) of the ultrafine fibers is preferably 0.35 to 0.6 and more preferably 0.37 to 0.55. If the solution viscosity (ηsp/c) of ultrafine fibers of PET or its copolymer is 0.3 or greater, then the high flow property due to overly low crystallization will be inhibited, thereby hastening solidification and inhibiting fusion between the filaments, and making it possible to inhibit reduction in surface area. If the solution viscosity (ηsp/c) of the ultrafine fibers of the PET or copolymer is 0.6 or lower, then it will be easier to obtain thin fibers without requiring excessive stretching energy, thereby allowing production cost to be lowered.

When the ultrafine fiber layer is formed by melt blowing, it is rendered fine by blowing with heated air during melt blowing, and is formed into a sheet on a conveyor net that is being drawn in from the back side, or on a collecting surface on the thick fiber layer, utilizing self-adhesion resulting from fusion between the fibers that are being blasted at high temperature. When fine fibers are formed by a melt blowing method, therefore, self-adhesion due to fusion between the fibers usually increases in strength, causing a fusion phenomenon between the ultrafine fibers. After researching this issue, however, the present inventors have found that it is possible to control the degree of fusion when forming fine fibers by setting a predetermined distance as the distance between the melt blow nozzle and the collecting surface.

The distance between the melt blow nozzle and the collecting surface is preferably 100 mm to 180 mm, more preferably 110 mm to 150 mm and even more preferably 120 mm to 140 mm. If the distance between the melt blow nozzle and collecting surface is 100 mm or greater, it will be easier to inhibit fusion between the ultrafine fibers even with a high temperature and flow rate of the heated air. If the distance is 180 mm or smaller, entanglement between the fibers in air will be less likely to occur and marks will be less likely to be generated, while the self-adhesion of fusion will not be overly weak and handleability during the layering step will be satisfactory.

The mean fiber size of the ultrafine fiber layer (M) is preferably 0.3 μm to 7 μm, more preferably 0.4 μm to 5 μm and even more preferably 0.6 μm to 2 μm. If the size is 0.3 μm or greater there will be no need for stringent conditions for spinning by melt blowing, and stable fibers can be obtained. If the fiber size is 7 μm or smaller, on the other hand, the fiber size will be sufficiently fine and an adequate sound absorption effect will be obtained, and if the layer is composed of a complex of a thick fiber layer (S) and an ultrafine fiber layer (M), the microfilaments will infiltrate into the gaps of the thick fiber layer (S) producing an effect of filling the gaps, thereby creating a more compact structure and further increasing the sound absorption effect.

The basis weight of the ultrafine fiber layer (M) is 1 g/m$^2$ to 40 g/m$^2$, preferably 2 g/m$^2$ to 25 g/m$^2$ and more preferably 3 g/m$^2$ to 20 g/m$^2$, from the viewpoint of obtaining an adequate sound absorption property with a low basis weight.

The material used for the ultrafine fiber layer (M) may be any of the same thermoplastic synthetic resins usable for the thick fiber layer (S) described above.

The shapes of the fiber cross-sections of the skin material forming the composite sound-absorbing material of the embodiment are not particularly restricted, but from the viewpoint of strength they are preferably circular cross-sections, while from the viewpoint of increasing the surface area of the fibers and forming microvoids, they are preferably atypical cross-sections, as in flat yarn.

A filler that includes a synthetic resin may also be added to the skin material forming the composite sound-absorbing material of the embodiment. Particularly when the material is composed of a thick fiber layer (S) alone, it is highly preferred to add a filler in order to obtain a sound absorption effect with a low basis weight, with the air permeability controlled and with sufficient surface area per unit area.

The content of the filler in the skin material is preferably 3 g/m$^2$ to 25 g/m$^2$ and more preferably 3 g/m$^2$ to 20 g/m$^2$. Within this range it is possible to adequately control the air permeability while increasing the surface area per unit area, and to inhibit adhesion of resin onto the die during thermoforming, making it possible to inhibit attachment of the compact onto the die and allowing satisfactory moldability to be achieved, so that the punching workability of the compact is satisfactory. The filler content is the total content of the synthetic resin, with the filler, pigment and flame retardant.

The synthetic resin used in the filler may be a thermosetting resin or thermoplastic resin, with thermosetting resins including urethane-based resins, melamine-based resins, ester-binding thermosetting acrylic resins, phenol resins and thermosetting polyester-based resins. Thermoplastic resins to be used include polyester-based resins and acrylic-based resins.

A preferred type of thermosetting resin is an ester-binding thermosetting acrylic resin. An ester-binding thermosetting acrylic resin is cured by esterification reaction between the acid of a polymer obtained by radical polymerization, comprising an ethylenic unsaturated dicarboxylic acid, and the hydroxyl group in an alkanolamine which has a hydroxyl group. Crosslinking is an esterification reaction and thus produces water alone as the by-product without hazardous substances such as formaldehyde, making it suitable for vehicle interior finishing materials.

Another type of preferred thermosetting resin is that of phenol-alkylresorcin co-condensates of phenol-based resins. Phenol-alkylresorcin co-condensates have high stability in aqueous solution and have the advantage of being able to be stored for longer periods at ordinary temperature compared to condensation products of phenols alone. Alkylresorcins also have the advantage of high reactivity with formaldehydes and complementary reaction with free aldehydes, thereby reducing the free aldehyde content in the resin.

A preferred type of thermoplastic resin is that of polyester-based resins. A polyester-based resin has relatively high Tg, and after addition to the skin material it exhibits low stickiness at low temperature even when dry, thus having a satisfactory feel on the skin, and low resin transfer.

A filler may also be mixed into the filler to provide suitable surface area while creating a dense skin material. Examples of fillers include hollow granules such as Shirasu balloons, pearlite, glass balloons and hollow ceramics, plastic foam and foam grains, and inorganic fillers of calcium carbonate, magnesium carbonate, magnesium hydroxide, aluminum hydroxide, alumina, silica and colloidal silica. Hollow granules such as Shirasu balloons are preferred among these because their interiors are hollow which tends to improve the sound absorption performance.

The mean particle size of the filler is preferably 1 to 100 µm, more preferably 10 to 90 µm and even more preferably 15 to 70 µm. If the mean particle size is 1 µm or greater, gaps will more easily form between the filler, avoiding excessive increase in compactness and denseness and avoiding lack of voids, so that penetration of sound will be adequate and the sound absorption effect will tend to increase. If it is 100 µm or smaller, on the other hand, formation of excessively large gaps will tend to be inhibited, for a dense skin layer and more suitable surface area. The mixing ratio of the filler and resin may be 55:45 to 70:30, as the solid ratio. Within this range, the filler will be adequately anchored to the skin material and gaps between the filler will be less likely to be fully filled with the resin.

The method for adding the filler to the skin material may be a method of coating a solution containing the filler (hereunder also referred to as "filler solution") onto one side using a roll coater, knife coater, flow coater or the like, or a method of coating over the entire surface in the thickness direction by impregnation, such as dip nipping. When the nonwoven fabric is one in which the skin material is composed of a thick fiber layer (S) alone, it is preferred to use a coating method where the resin is on one side, and particularly roll coating, from the viewpoint of inhibiting adhesion of the resin onto the die during thermoforming, or inhibiting attachment of the compact onto the die. When the skin material is composed of a complex of a thick fiber layer (S) and ultrafine fiber layer (M), such as SMS, for example, it will be possible for the filler solution to adhere to the surface of the ultrafine fiber layer (M) producing surface tension even when using dip nipping, and the synthetic resin will be less likely to bleed out to the surface of the thick fiber layer (S), thus making it possible to inhibit adhesion of the resin to the die during thermoforming, and to inhibit attachment of the compact to the die. Furthermore, the presence of the resin over the entire region in the thickness direction of the epidermis helps to provide a suitable surface area while ensuring a dense skin layer with an extremely small amount of resin. The filler solution is preferably an aqueous solution, aqueous emulsion or aqueous dispersion from the viewpoint of easy handling.

The drying temperature for coating is preferably in the range of 100 to 130° C. This range will allow sufficient drying of the filler solution, while crystallization of the skin material promoted by heating can inhibit reduction in flexibility or moldability, and can inhibit hardening before thermoforming when a thermosetting resin has been used, allowing excellent moldability to be exhibited during thermoforming.

A black pigment, a flame retardant such as a phosphorus agent, or a water-repellent agent, may also be simultaneously mixed with the filler to impart the black coloration, flame retardance or water-repellency required for a skin layer on a hood insulator, for example.

The bulk density of the skin material forming the composite sound-absorbing material of the embodiment is preferably 0.1 $g/cm^3$ to 0.7 $g/cm^3$, more preferably 0.15 $g/cm^3$ to 0.6 $g/cm^3$ and even more preferably 0.2 $g/cm^3$ to 0.55 $g/cm^3$. If the bulk density is 0.1 $g/cm^3$ or greater, the denseness of the nonwoven fabric will increase and the sound-reducing effect will be improved. If the bulk density is 0.7 $g/cm^3$ or lower, the skin material will not have excessive denseness or too few voids, infiltration of sound will be sufficient, the sound absorption coefficient will be unlikely to decrease especially near mid frequencies of 4000 Hz, and the workability will be improved.

The air permeability of the skin material forming the composite sound-absorbing material of the embodiment, as measured by the Frazier method of JIS L 1906, is preferably 100 $mL/cm^2/sec$ or lower, more preferably 0.1 $mL/cm^2/sec$ to 50 $mL/cm^2/sec$ and even more preferably 0.5 $mL/cm^2/sec$ to 30 $mL/cm^2/sec$. If the air permeability is 100 $mL/cm^2/sec$ or lower, the wavelength of infiltrating sound can be reduced and an effect of lowering sound energy can be easily obtained.

When the skin material forming the composite sound-absorbing material of the embodiment is a nonwoven fabric, the dry heat shrinkage of the nonwoven fabric during 10 minutes in a 180° C. atmosphere is preferably 5% or lower, more preferably 4% or lower and even more preferably 3.5% or lower. If it does not exceed 5% then notable formation of wrinkles by contraction during molding will be unlikely to occur.

The sound-absorbing base material preferably has the specified bulk density in order to form a composite sound-absorbing material that has a high sound absorption property while also having a small thickness and light weight, and excellent shape stability, by combining a sound-absorbing base material and a skin material. The bulk density of the sound-absorbing base material can be adjusted by compression adjustment with a known hot press machine before combination with a nonwoven fabric or layered nonwoven fabric, or by compression adjustment during integral molding with the sound-absorbing base material after a synthetic fiber nonwoven fabric has been layered by thermoforming in a vehicle member. The bulk density of the base material used in the composite sound-absorbing material of the embodiment is preferably 0.01 $g/cm^3$ to 0.1 $g/cm^3$, more preferably 0.02 $g/cm^3$ to 0.08 $g/cm^3$ and even more preferably 0.03 $g/cm^3$ to 0.05 $g/cm^3$. If the bulk density is 0.01 $g/cm^3$ or greater, the sound absorption property will be unlikely to be reduced and there will be no need to increase the thickness beyond the necessary level. If the bulk density is 0.1 g/cm³ or lower, sounds passing through the nonwoven fabric skin material will readily infiltrate into the sound-absorbing base material, and the abrasion resistance and workability will be improved.

Examples of materials for sound-absorbing base materials include open-cell resin foams made of polyethylene resin, polypropylene resin, polyurethane resin, polyester resin, acrylic resin, polystyrene resin or melamine resin, or sound-absorbing synthetic fiber nonwoven fabrics obtained by layering staple fibers and/or long fibers, including polyolefin-based fibers such as polyethylene, polypropylene and copolymerized polypropylene, polyamide-based fibers such as nylon 6, nylon 66 and copolymerized polyamide, polyester-based fibers such as polyethylene terephthalate, polybutylene terephthalate, copolymerized polyesters and aliphatic polyesters, composite fibers with a core-sheath structure comprising a combination of polyethylene, polypropylene or copolymerized polyester as the sheath and polypropylene or polyester as the core, or biodegradable fibers such as polylactic acid, polybutylene succinate or polyethylene succinate, with staple fibers or with staple fibers and long fibers, and tangling them by a known needle punching method, and felt. Examples of inorganic materials include glass fibers and glass wool.

An open-cell resin foam is preferably a nonwoven fabric made of a melamine resin or urethane resin from the viewpoint of lightweight properties and sound absorption properties, and a sound-absorbing synthetic fiber nonwoven fabric is preferably made of polyester-based fibers from the viewpoint of flame retardance and heat resistance.

The composite sound-absorbing material of this embodiment can be obtained by integrally joining the skin material with a sound-absorbing base material having a coarse structure. Joining between the skin material and sound-absorbing base material may be by a method of inserting heat-fusing fibers between the bonding surfaces, or a method of applying a hot-melt resin or bonding agent.

In the method of joining a skin material with a sound-absorbing base material using a bonding agent, a hot-melt adhesive is applied onto the nonwoven fabric skin material by a curtain spray system, dot system or screen system at 2 g/m² to 30 g/m² and heated from the nonwoven fabric skin material side for softening and melting of the coated bonding agent, to allow bonding to the sound-absorbing base material.

The adhesive force between the skin material and sound-absorbing base material is preferably 0.1 N/10 mm or greater, and more preferably 0.2 N/10 mm to 5 N/10 mm. If the adhesive force is 0.1 N/10 mm or greater there will tend to be fewer problems such as detachment during cutting and transport of the sound-absorbing material. In order to obtain high adhesive force it is preferred to provide a low-melting-point component layer on the bonding surface of the nonwoven fabric skin material, and preferably a hot-melt bonding agent is coated onto the open-cell resin foam or fiber porous material.

The sound absorption coefficient of the composite sound-absorbing material of the embodiment at a frequency of 1000 Hz (low frequency) is preferably 30% or greater, the sound absorption coefficient at 2500 Hz (mid frequency) is preferably 90% or greater and the sound absorption coefficient at 5000 Hz (high frequency) is preferably 80% or greater, as measured with normal incidence according to JIS-1405.

EXAMPLES

The present invention will now be explained in more specific detail through the following Examples and Comparative Examples, which are not intended to limit the invention in any way. The direction of flow during production of a nonwoven fabric (the machine direction) is referred to as the MD direction, and the width direction which is the direction perpendicular to that direction is referred to as the CD direction.

The physical properties for the Examples were obtained using the following methods. Measurement of the physical properties was conducted by the following methods as a rule for the purpose of the Examples, but when circumstances do not allow measurement by these methods, appropriate reasonable alternative methods may be used.

(1) Surface Area Per Unit Area (m²/m²)

An appropriate amount (about 0.02 to 2.5 g) of sample of the skin material or base material was packed into a cell and pretreated using a VACU-PREP 061LB Sample Pretreatment apparatus by Shimadzu Corp. (70° C.×40 min drying, followed by 40 min cooling). The sample was set in a TriStar 113020 automated specific surface area measuring system by Shimadzu Corp., and with krypton gas adsorption on the sample surface, the following BET formula:

$$P/V(P0-P))=1/(Vm \times C)+((C-1)/(Vm \times C))(P/P0)$$

{where P: adsorption equilibrium pressure, P0: saturated water vapor pressure (Pa), Vm: monolayer adsorption (mg/g), C: adsorption heat, wherein parameter(−)<0; the relational expression being valid particularly when P/P0 is in the range of 0.05 to 0.35}
was applied and the specific surface area value (m²/g) was calculated, calculating the surface area per unit area (m²/m²) to be: specific surface area value (m²/g)×basis weight (g/m²). The BET formula is a formula expressing the relationship between adsorption equilibrium pressure P and adsorption Vm at that pressure, at a constant temperature and at adsorption equilibrium.

(2) Basis Weight (g/m²)

The basis weights of the skin material and base material are those measured according to JIS L 1913. For the layered body (composite sound-absorbing material and the skin material which is a layered nonwoven fabric), the basis weight of each layer is the value calculated from the production conditions for the Example. When the production conditions are unknown, the basis weight of each separable layer can be measured according to JIS L 1913, after removing each as a monolayer. When interlayer separation is not possible, an X-ray CT image of the nonwoven fabric may be taken and the calculation may be made from the area of the observed region, the volume occupied by the ultrafine fiber layer, the resin density and the thickness, based on the X-ray CT image.

(3) Mean Fiber Size (μm)

A VHX-700F microscope by Keyence Corp. is used to take a 500×-magnified photograph, and the average value for 10 fibers within the focus of the observation field is determined.

(4) Bulk Density (g/cm³)

The ratio (basis weight)/(thickness) is calculated, and the weight per unit volume is determined.

(5) Thickness (mm)

This is determined according to JIS L 1913 B. The thickness under a pressure load of 0.02 kPa is measured at 3 or more locations, and the average value is determined. The thickness of the nonwoven fabric skin material is measured under a load of 20 kPa.

(6) Air Permeability

This is measured by the Frazier method described in JIS L 1906.

(7) Sound Absorption Coefficient of Composite Sound-Absorbing Material

Using a normal incidence measuring device (Type 4206T by Bruel & Kjar Co.) according to JIS A 1405, the sound absorption coefficient A (%) is measured at the typical frequencies of 1000 Hz, 2500 Hz, and 5000 Hz. The base material used is fabricated as described in the Examples and Comparative Examples.

(8) Punching Workability

A punching blade is placed on the composite sound-absorbing material and punching is carried out with a hydraulic cutter. The cross-section is visually examined and judged on the following evaluation scale.

(Evaluation Scale)

G: No cross-sectional roughness or uncut threads.
F: Some cross-sectional roughness and/or uncut threads.
P: Extensive cross-sectional roughness and/or uncut threads.

Example 1

A polyethylene terephthalate resin (solution viscosity ηsp/c: 0.77, measured at 1%, 25° C. using orthochlorophenol, melting point: 263° C.) was supplied to a regular melt spinning apparatus, melted at 300° C. and discharged through a spinning nozzle having a spinning hole with a circular cross-section, and a high-speed airflow traction device was used to cool the yarn with an air jet while stretching, to form a fiber web (S1) (basis weight: 15.0 g/m$^2$, mean fiber size: 13 μm) on a net. Polyethylene terephthalate (solution viscosity ηsp/c: 0.50, melting point: 260° C.) was directly ejected onto the obtained thick fiber web (S1) from a melt blow nozzle, under conditions with a spinning temperature of 300° C., heated air at 320° C. and 1000 Nm$^3$/hr, to form an ultrafine fiber web (M) (basis weight: 10.0 g/m$^2$, mean fiber size: 1.7 μm). During this step, the distance from the melt blow nozzle to the thick fiber layer was 110 mm, and the suction wind speed at the collecting surface directly under the melt blow nozzle was set to 7 m/sec. A thick fiber web (S2) of polyethylene terephthalate was also formed on the obtained ultrafine fiber web, in the same manner as the fiber web (S1). The obtained layered web was then subjected to thermocompression bonding with a calendar linear pressure of 30 N/mm, using a flat roll and an IL pattern embossing roll designed for a contact bonding area ratio during thermocompression bonding of 11%, with the surface temperature of the embossing roll at 220° C. and the surface temperature of the flat roll at 220° C., to obtain a nonwoven fabric skin material having a basis weight of 40 g/m$^2$ and a bulk density of 0.19 g/cm$^3$, and a surface area per unit area of 16.4 m$^2$/m$^2$.

The base material was joined with the nonwoven fabric skin material using felt (resin felt, by Terada Takaron) having a thickness of 20 mm, a basis weight of 1400 g/m$^2$, a bulk density of 0.070 g/cm$^3$ and a surface area per unit area of 368 (m$^2$/m$^2$). The joining was by coating the copolymerized polyester-based hot-melt powder (melting point: 130° C.) to 10 g/m$^2$ between the surface material and the base material, and joining by heat treatment, to obtain a composite sound-absorbing material of the invention. The properties are shown in Table 1 below.

Example 2

A composite sound-absorbing material was obtained in the same manner as Example 1, except that the base material used was glass wool having a thickness of 20 mm, a mean fiber size of 7 μm, a basis weight of 1000 g/m$^2$, a bulk density of 0.050 g/cm$^3$ and a surface area per unit area of 331 (m$^2$/m$^2$) The properties are shown in Table 1 below.

Example 3

A composite sound-absorbing material was obtained in the same manner as Example 1, except that the base material used was a foamed melamine resin (BASOTECT TG, melamine resin continuous foam by BASF Corp.) having a thickness of 20 mm, a basis weight of 200 g/m$^2$, a bulk density of 0.010 g/cm$^3$ and a surface area per unit area of 234 (m$^2$/m$^2$). The properties are shown in Table 1 below.

Example 4

A composite sound-absorbing material was obtained in the same manner as Example 1, except that the base material used was a urethane resin foam (F-KL, urethane resin continuous foam by Inoac Co.) having a thickness of 20 mm, a basis weight of 320 g/m$^2$, a bulk density of 0.016 g/cm$^3$ and a surface area per unit area of 102 (m$^2$/m$^2$). The properties are shown in Table 1 below.

Example 5

A composite sound-absorbing material was obtained in the same manner as Example 1, except that the basis weights of the thick fiber webs (S1, S2) of the nonwoven fabric skin material were each 11.2 g/m$^2$, the basis weight of the ultrafine fiber web (M) was 7.6 g/m$^2$, a texture pattern embossing roll and flat roll were used with a contact bonding area ratio of 15% during thermocompression bonding, and the base material used was felt (resin felt, by Terada Takaron) having a thickness of 15 mm, a basis weight of 1100 g/m$^2$, a bulk density of 0.073 g/cm$^3$ and a surface area per unit area of 289 (m$^2$/m$^2$). The properties are shown in Table 1 below.

Example 6

A composite sound-absorbing material was obtained in the same manner as Example 1, except that the basis weights of the thick fiber webs (S1, S2) of the nonwoven fabric skin material were each 26.9 g/m$^2$, the basis weight of the ultrafine fiber web (M) was 16.3 g/m$^2$, the mean fiber size was 2.2 μm, and the base material used was felt (resin felt, by Terada Takaron) having a thickness of 15 mm, a basis weight of 1100 g/m$^2$, a bulk density of 0.073 g/cm$^3$ and a surface area per unit area of 289 (m$^2$/m$^2$). The properties are shown in Table 1 below.

Example 7

A polyethylene terephthalate resin (solution viscosity ηsp/c: 0.77, measured at 1%, 25° C. using orthochlorophenol, melting point: 263° C.) was supplied to a regular melt spinning apparatus, melted at 300° C. and discharged through a spinning nozzle having a spinning hole with a circular cross-section, and a high-speed airflow traction device was used to cool the yarn with an air jet while stretching, to form a fiber web (S1) (basis weight: 11.2 g/m$^2$, mean fiber size: 13 μm) on a net. Polyethylene terephthalate (solution viscosity ηsp/c: 0.50, melting point: 260° C.) was directly ejected as yarn onto the obtained thick fiber web (S1) from a melt blow nozzle, under conditions with a spinning temperature of 330° C., heated air at 370° C. and 1300 Nm³/hr, to form an ultrafine fiber web (M) (basis weight: 7.6 g/m², mean fiber size: 0.8 μm). During this step, the distance from the melt blow nozzle to the thick fiber layer was 120 mm, and the suction wind speed at the collecting surface directly under the melt blow nozzle was set to 7 m/sec. A thick fiber web (S2) of polyethylene terephthalate was also formed on the obtained ultrafine fiber web, in the same manner as the fiber web (S1). The obtained layered web was then subjected to thermocompression bonding with a calender linear pressure of 30 N/mm, using a flat roll and an IL pattern embossing roll designed for a contact bonding area ratio during thermocompression bonding of 11%, with the surface temperature of the embossing roll at 220° C. and the surface temperature of the flat roll at 220° C., to obtain a nonwoven fabric skin material having a basis weight of 30 g/m² and a bulk density of 0.19 g/cm³, and a surface area per unit area of 17.5 m²/m².

The base material was joined with the nonwoven fabric skin material using felt (resin felt, by Terada Takaron) having a thickness of 15 mm, a basis weight of 1100 g/m², a bulk density of 0.073 g/cm³ and a surface area per unit area of 289 (m²/m²). The joining was by coating the copolymerized polyester-based hot-melt powder (melting point: 130° C.) to 10 g/m² between the surface material and the base material, and joining by heat treatment, to obtain a composite sound-absorbing material. The properties are shown in Table 1 below.

Example 8

A resin comprising a copolymerized polyester (melting point: 208° C.) as the sheath component and polyethylene terephthalate (solution viscosity ηsp/c: 0.77, measured at 1%, 25° C. using orthochlorophenol, melting point: 263° C.) as the core component was supplied to a regular melt spinning apparatus, melted at 300° C. and discharged through a two-component spinning nozzle having a spinning hole with a circular cross-section, and a high-speed airflow traction device was used to cool the yarn with an air jet while stretching, to form a fiber web (S1) (basis weight: 15.0 g/m², mean fiber size: 13.0 μm) on a net. Polyethylene terephthalate (solution viscosity ηsp/c: 0.50, melting point: 260° C.) was directly ejected onto the obtained thick fiber web (S1) from a melt blow nozzle, under conditions with a spinning temperature of 300° C., heated air at 320° C. and 1000 Nm³/hr, to form an ultrafine fiber web (M) (basis weight: 10.0 g/m², mean fiber size: 1.7 μm). During this step, the distance from the melt blow nozzle to the thick fiber layer was 110 mm, and the suction wind speed at the collecting surface directly under the melt blow nozzle was set to 7 m/sec. A polyethylene terephthalate resin (solution viscosity ηsp/c: 0.77, melting point: 263° C.) was further discharged onto the obtained ultrafine fiber web through a spinning nozzle having a spinning hole with a circular cross-section, forming a thick fiber web (S2) (basis weight: 15.0 g/m², mean fiber size: 13.0 μm) obtained in the same manner as the fiber web (S1). The obtained layered web was then subjected to thermocompression bonding with a calender linear pressure of 30 N/mm, using a flat roll and an IL pattern embossing roll designed for a contact bonding area ratio during thermocompression bonding of 11%, with the surface temperature of the embossing roll at 220° C. and the surface temperature of the flat roll at 120° C., to obtain a nonwoven fabric skin material having a basis weight of 40 g/m² and a bulk density of 0.19 g/cm³, and a surface area per unit area of 16.2 m²/m².

The base material was joined with the nonwoven fabric skin material using felt (resin felt, by Terada Takaron) having a thickness of 20 mm, a basis weight of 1400 g/m², a bulk density of 0.070 g/cm³ and a surface area per unit area of 368 (m²/m²). The joining was by heating and pressurized heat treatment in an atmosphere with a temperature of 150° C. while the thick fiber web (S2) surface and felt were layered and sandwiched by a mesh-like conveyor belt, to obtain a composite sound-absorbing material. The properties are shown in Table 1 below.

Example 9

A polyethylene terephthalate resin (solution viscosity ηsp/c: 0.77, measured at 1%, 25° C. using orthochlorophenol, melting point: 263° C.) was supplied to a regular melt spinning apparatus, melted at 300° C. and discharged through a spinning nozzle having a spinning hole with a circular cross-section, and a high-speed airflow traction device was used to cool the yarn with an air jet while stretching, to form a fiber web (S1) (basis weight: 10.7 g/m², mean fiber size: 13 μm) on a net. Polyethylene terephthalate (solution viscosity ηsp/c: 0.50, melting point: 260° C.) was directly ejected onto the obtained thick fiber web (S1) from a melt blow nozzle, under conditions with a spinning temperature of 300° C., heated air at 320° C. and 1000 Nm³/hr, to form an ultrafine fiber web (M) (basis weight: 6.6 g/m², mean fiber size: 1.7 μm). During this step, the distance from the melt blow nozzle to the thick fiber layer was 110 mm, and the suction wind speed at the collecting surface directly under the melt blow nozzle was set to 7 m/sec. A thick fiber web (S2) of polyethylene terephthalate was also formed on the obtained ultrafine fiber web, in the same manner as the fiber web (S1). The obtained layered web was then thermocompression bonded at a calender linear pressure of 30 N/mm, using a texture-patterned embossing roll and a flat roll having a contact bonding area ratio of 15% during thermocompression bonding, with an embossing roll surface temperature of 220° C. and a flat roll surface temperature of 220° C.

It was then passed through a tank containing an aqueous mixture of a pigment (2.1% solid mass in water), a flame retardant (6.0% solid mass in water) and a water-soluble esteric binder (1.0% solid mass in water) and a dip nip step where it was nipped between rubber rolls, and then dried using a pin tenter oven at 100° C., to obtain a nonwoven fabric skin material having a resin coverage of 3 g/m² and a total basis weight of 28 g/m².

Glass wool having a thickness of 20 mm, a mean fiber size of 4 μm, a basis weight of 700 g/m², a bulk density of 0.035 g/cm³ and a surface area per unit area of 489 (m²/m²) was used as the base material and joined with the nonwoven fabric skin material. The joining was by coating the copolymerized polyester-based hot-melt powder (melting point: 130° C.) to 10 g/m² between the surface material and the base material, and joining by heat treatment, to obtain a composite sound-absorbing material. The properties are shown in Table 1 below.

Example 10

A polyethylene terephthalate resin (solution viscosity ηsp/c: 0.77, measured at 1%, 25° C. using orthochlorophenol, melting point: 263° C.) was supplied to a regular melt spinning apparatus, melted at 300° C. and discharged through a spinning nozzle having a spinning hole with a circular cross-section, and a high-speed airflow traction device was used to cool the yarn with an air jet while stretching, to form a fiber web (S1) (basis weight: 40.0 g/m², mean fiber size: 13 μm) on a net. The web was then thermocompression bonded at a calender linear pressure of 30 N/mm, using an IL pattern embossing roll and a flat roll having a contact bonding area ratio of 11% during thermocompression bonding, with an embossing roll surface temperature of 220° C. and a flat roll surface temperature of 220° C.

Using a resol-type phenol/alkylresorcin initial co-condensation resin (45% solid mass aqueous solution) as the thermosetting resin solution, Shirasu balloons (mean particle size: 45 μm) were added as filler to a filler/thermosetting resin mixing ratio of 55/45, an acrylic thickening agent was further added for adjustment to a 20% solid mass solution with a viscosity of 150 Poise, and the obtained coating solution was applied by a roll coating method to a coating amount of 25 g/m² in terms of solid content, after which it was heat dried for 3 minutes at a heating temperature of 120° C. to obtain a nonwoven fabric skin material with the thermosetting resin in a half-cured state.

The base material was joined with the nonwoven fabric skin material using felt (resin felt, by Terada Takaron) having a thickness of 15 mm, a basis weight of 1100 g/m², a bulk density of 0.073 g/cm³ and a surface area per unit area of 289 (m²/m²). The joining was by coating the copolymerized polyester-based hot-melt powder (melting point: 130° C.) to 10 g/m² between the surface material and the base material, and joining by heat treatment, to obtain a composite sound-absorbing material. The properties are shown in Table 1 below.

Example 11

Polyethylene terephthalate (solution viscosity ηsp/c: 0.50, melting point: 260° C.) was directly ejected from a melt blow nozzle, under conditions with a spinning temperature of 300° C., heated air at 320° C. and 1000 Nm³/hr, to form an ultrafine fiber web (M) (basis weight: 40.0 g/m², mean fiber size: 3.5 μm). During this step, the distance from the melt blow nozzle to the thick fiber layer was 100 mm, and the suction wind speed at the collecting surface directly under the melt blow nozzle was set to 7 m/sec. The web was then thermocompression bonded at a calender linear pressure of 30 N/mm, using an IL pattern embossing roll and a flat roll having a contact bonding area ratio of 11% during thermocompression bonding, with an embossing roll surface temperature of 120° C. and a flat roll surface temperature of 120° C.

The base material was joined with the nonwoven fabric skin material using felt (resin felt, by Terada Takaron) having a thickness of 15 mm, a basis weight of 1100 g/m², a bulk density of 0.073 g/cm³ and a surface area per unit area of 289 (m²/m²). The joining was by coating the copolymerized polyester-based hot-melt powder (melting point: 130° C.) to 10 g/m² between the surface material and the base material, and joining by heat treatment, to obtain a composite sound-absorbing material. The properties are shown in Table 1 below.

Example 12

A composite sound-absorbing material was obtained in the same manner as Example 9, except that the filler was not added. The properties are shown in Table 1 below.

Example 13

Staple fibers (fiber lengths: 10 mm) with fiber sizes of 15 μm and 4 μm were mixed with a water-soluble esteric binder (1.0% solid mass in water), a thickening agent, a dispersing agent and water to prepare two different liquid mixtures, and a papermaking method was used to obtain a layered body of: thick fiber layer A/ultrafine fiber layer/thick fiber layer B. The layered body was heated at 130° C. for 3 minutes to obtain a nonwoven fabric skin material. The base material was joined with the nonwoven fabric skin material using felt (resin felt, by Terada Takaron) having a thickness of 20 mm, a basis weight of 1400 g/m², a bulk density of 0.070 g/cm³ and a surface area per unit area of 368 (m²/m²). The joining was by coating the copolymerized polyester-based hot-melt powder (melting point: 130° C.) to 10 g/m² between the surface material and the base material, and joining by heat treatment, to obtain a composite sound-absorbing material of the invention. The properties are shown in Table 1 below.

TABLE 1

| | | | Example 1 | Example 2 | Example 3 | Example 4 | Example 5 | Example 6 | Example 7 |
|---|---|---|---|---|---|---|---|---|---|
| Skin material | Upper layer (S1) | Resin type | PET | PET | PET | PET | PET | PET | PET |
| | | Fiber size (μm) | 13 | 13 | 13 | 13 | 13 | 13 | 13 |
| | | Basis weight (g/m²) | 15 | 15 | 15 | 15 | 11.2 | 26.9 | 11.2 |
| | Middle layer (M) | Resin type | PET | PET | PET | PET | PET | PET | PET |
| | | Fiber size (μm) | 1.7 | 1.7 | 1.7 | 1.7 | 1.7 | 2.2 | 0.8 |
| | | Basis weight (g/m²) | 10 | 10 | 10 | 10 | 7.6 | 16.3 | 7.6 |
| | Lower layer (S2) | Resin type | PET | PET | PET | PET | PET | PET | PET |
| | | Fiber size (μm) | 13 | 13 | 13 | 13 | 13 | 13 | 13 |
| | | Basis weight (g/m²) | 15 | 15 | 15 | 15 | 11.2 | 26.9 | 11.2 |
| | Filler content (g/m²) | | 0 | 0 | 0 | 0 | 0 | 0 | 0 |
| | Total basis weight (g/m²) | | 40 | 40 | 40 | 40 | 30 | 70 | 30 |
| | Partial thermocompression bonding rate (%) | | 11 | 11 | 11 | 11 | 15 | 11 | 11 |
| | Thickness (mm) | | 0.21 | 0.21 | 0.21 | 0.21 | 0.13 | 0.23 | 0.16 |
| | Bulk density (g/cm³) | | 0.19 | 0.19 | 0.19 | 0.19 | 0.23 | 0.30 | 0.19 |
| | Air permeability cc/cm²/sec) | | 25 | 25 | 25 | 25 | 28 | 10 | 8 |
| | Surface area per unit area (m²/m²) | | 16.4 | 16.4 | 16.4 | 16.4 | 11.8 | 19.5 | 17.5 |
| Base material | Form | | Felt | Glass wool | Melamine resin continuous foam | Urethane resin continuous foam | Felt | Felt | Felt |
| | Thickness (mm) | | 20 | 20 | 20 | 20 | 15 | 15 | 15 |
| | Bulk density (g/cm³) | | 0.070 | 0.050 | 0.010 | 0.016 | 0.073 | 0.073 | 0.073 |
| | Basis weight (g/m²) | | 1400 | 1000 | 200 | 320 | 1100 | 1100 | 1100 |
| | Surface area per unit area (m²/m²) | | 368 | 331 | 234 | 102 | 289 | 289 | 289 |

TABLE 1-continued

| | | | | | | | | |
|---|---|---|---|---|---|---|---|---|
| Joining | Joining means | | Resin | Resin | Resin | Resin | Resin | Resin | Resin |
| | Basis weight (g/m²) | | 10 | 10 | 10 | 10 | 10 | 10 | 10 |
| Composite sound-absorbing material | Basis weight (g/m²) | | 1450 | 1050 | 250 | 370 | 1140 | 1180 | 1140 |
| | Thickness (mm) | | 20 | 20 | 20 | 20 | 15 | 15 | 15 |
| | Bulk density (g/cm³) | | 0.073 | 0.053 | 0.013 | 0.019 | 0.076 | 0.079 | 0.076 |
| | Surface area ratio (skin material:base material) | | 1:22 | 1:20 | 1:14 | 1:6.2 | 1:24 | 1:15 | 1:17 |
| | Sound absorption (%) | Low frequency: 1000 Hz | 46 | 45 | 45 | 48 | 31 | 36 | 37 |
| | | Mid frequency: 2500 Hz | 99 | 99 | 97 | 90 | 95 | 98 | 95 |
| | | High frequency: 5000 Hz | 89 | 85 | 84 | 80 | 88 | 82 | 81 |
| | Punching workability | | F | F | F | F | P | F | P |

| | | | Example 8 | Example 9 | Example 10 | Example 11 | Example 12 | Example 13 |
|---|---|---|---|---|---|---|---|---|
| Skin material | Upper layer (S1) | Resin type | PET | PET | PET | — | PET | PET |
| | | Fiber size (μm) | 13 | 13 | 13 | — | 13 | 15 |
| | | Basis weight (g/m²) | 15 | 10.7 | 40 | — | 10.7 | 20 |
| | Middle layer (M) | Resin type | PET | PET | — | PET | PET | PET |
| | | Fiber size (μm) | 1.7 | 1.7 | — | 3.5 | 1.7 | 4 |
| | | Basis weight (g/m²) | 10 | 6.6 | — | 40 | 6.6 | 5 |
| | Lower layer (S2) | Resin type | PET/CoPET | PET | — | — | PET | PET |
| | | Fiber size (μm) | 13 | 13 | — | — | 13 | 15 |
| | | Basis weight (g/m²) | 15 | 10.7 | — | — | 10.7 | 20 |
| | Filler content (g/m²) | | 0 | 3 | 25 | 0 | 0 | 5 |
| | Total basis weight (g/m²) | | 40 | 28 | 65 | 40 | 25 | 50 |
| | Partial thermocompression bonding rate (%) | | 11 | 15 | 11 | 11 | 15 | — |
| | Thickness (mm) | | 0.21 | 0.1 | 0.21 | 0.18 | 0.1 | 0.32 |
| | Bulk density (g/cm³) | | 0.19 | 0.28 | 0.31 | 0.22 | 0.25 | 0.16 |
| | Air permeability cc/cm²/sec | | 27 | 29 | 23 | 27 | 40 | 36 |
| | Surface area per unit area (m²/m²) | | 16.2 | 12.5 | 10.1 | 14.0 | 10.3 | 15.0 |
| Base material | Form | | Felt | Glass wool | Felt | Felt | Glass wool | Felt |
| | Thickness (mm) | | 20 | 20 | 15 | 15 | 20 | 20 |
| | Bulk density (g/cm³) | | 0.070 | 0.035 | 0.073 | 0.073 | 0.035 | 0.070 |
| | Basis weight (g/m²) | | 1400 | 700 | 1100 | 1100 | 700 | 1400 |
| | Surface area per unit area (m²/m²) | | 368 | 489 | 289 | 289 | 173 | 368 |
| Joining | Joining means | | Heating | Resin | Resin | Resin | Resin | Resin |
| | Basis weight (g/m²) | | 0 | 10 | 10 | 10 | 10 | 10 |
| Composite sound-absorbing material | Basis weight (g/m²) | | 1440 | 738 | 1175 | 1140 | 735 | 1460 |
| | Thickness (mm) | | 20 | 20 | 15 | 15 | 20 | 20 |
| | Bulk density (g/cm³) | | 0.072 | 0.037 | 0.078 | 0.076 | 0.037 | 0.073 |
| | Surface area ratio (skin material:base material) | | 1:23 | 1:39 | 1:29 | 1:21 | 1:17 | 1:25 |
| | Sound absorption (%) | Low frequency: 1000 Hz | 48 | 56 | 33 | 32 | 42 | 38 |
| | | Mid frequency: 2500 Hz | 99 | 92 | 99 | 96 | 89 | 87 |
| | | High frequency: 5000 Hz | 91 | 80 | 81 | 87 | 80 | 83 |
| | Punching workability | | F | G | F | P | P | F |

Comparative Example 1

A polyethylene terephthalate resin (solution viscosity ηsp/c: 0.77, measured at 1%, 25° C. using orthochlorophenol, melting point: 263° C.) was supplied to a regular melt spinning apparatus, melted at 300° C. and discharged through a spinning nozzle having a spinning hole with a circular cross-section, and a high-speed airflow traction device was used to cool the yarn with an air jet while stretching, to form a fiber web (S1) (basis weight: 40.0 g/m², mean fiber size: 13 μm) on a net. The web was then thermocompression bonded at a calender linear pressure of 30 N/mm, using an IL pattern embossing roll and a flat roll having a contact bonding area ratio of 11% during thermocompression bonding, with an embossing roll surface temperature of 220° C. and a flat roll surface temperature of 220° C.

The base material was joined with the nonwoven fabric skin material using felt (resin felt, by Terada Takaron) having a thickness of 20 mm, a basis weight of 1400 g/m², a bulk density of 0.070 g/cm³ and a surface area per unit area of 368 (m²/m²). The joining was by coating the copolymerized polyester-based hot-melt powder (melting point: 130° C.) to 10 g/m² between the surface material and the base material, and joining by heat treatment, to obtain a composite sound-absorbing material. The properties are shown in Table 2 below.

Comparative Example 2

A composite sound-absorbing material was obtained in the same manner as Example 4, except that the basis weights of the thick fiber webs (S1, S2) of the nonwoven fabric skin material were both 30.0 g/m², and the basis weight of the ultrafine fiber web (M) was 20.0 g/m². The properties are shown in Table 2 below.

Comparative Example 3

A composite sound-absorbing material was obtained in the same manner as Example 2, except that the base material used was glass wool having a thickness of 20 mm, a mean fiber size of 4 μm, a basis weight of 1000 g/m², a bulk density of 0.050 g/cm³ and a surface area per unit area of 774 m²/m²) The properties are shown in Table 2 below.

Comparative Example 4

A composite sound-absorbing material was obtained in the same manner as Example 4, except that the base material used was a urethane resin foam (F-KL, urethane resin continuous foam by Inoac Co.) having a thickness of 15 mm, a basis weight of 240 g/m², a bulk density of 0.016 g/cm³ and a surface area per unit area of 75 m²/m²) The properties are shown in Table 2 below.

Comparative Example 5

A polyethylene terephthalate resin (solution viscosity ηsp/c: 0.77, measured at 1%, 25° C. using orthochlorophenol, melting point: 263° C.) was supplied to a regular melt spinning apparatus, melted at 300° C. and discharged through a spinning nozzle having a spinning hole with a circular cross-section, and a high-speed airflow traction device was used to cool the yarn with an air jet while stretching, to form a fiber web (S1) (basis weight: 11.2 g/m², mean fiber size: 13 μm) on a meshed net. Polyethylene terephthalate (solution viscosity ηsp/c: 0.30, melting point: 260° C.) was directly ejected onto the obtained thick fiber web (S1) from a melt blow nozzle, under conditions with a spinning temperature of 300° C., heated air at 320° C. and 900 Nm³/hr, to form an ultrafine fiber web (M) (basis weight: 7.6 g/m², mean fiber size: 2.0 μm). During this step, the distance from the melt blow nozzle to the thick fiber layer was 80 mm, and the suction wind speed at the collecting surface directly under the melt blow nozzle was set to 7 msec. A thick fiber web (S2) of polyethylene terephthalate was also formed on the obtained ultrafine fiber web, in the same manner as the fiber web (S1). The obtained layered web was then subjected to thermocompression bonding with a calender linear pressure of 30 N/mm, using a flat roll and an IL pattern embossing roll designed for a contact bonding area ratio during thermocompression bonding of 11%, with the surface temperature of the embossing roll at 220° C. and the surface temperature of the flat roll at 220° C., to obtain a nonwoven fabric skin material having a basis weight of 30 g/m² and a bulk density of 0.19 g/cm³, and a surface area per unit area of 9.1 m²/m².

The base material was joined with the nonwoven fabric skin material using felt (resin felt, by Terada Takaron) having a thickness of 20 mm, a basis weight of 1400 g/m², a bulk density of 0.070 g/cm³ and a surface area per unit area of 368 (m²/m³). The joining was by coating the copolymerized polyester-based hot-melt powder (melting point: 130° C.) to 10 g/m² between the surface material and the base material, and joining by heat treatment, to obtain a composite sound-absorbing material of the invention. The properties are shown in Table 2 below.

TABLE 2

|  |  |  | Comp. Example 1 | Comp. Example 2 | Comp. Example 3 | Comp. Example 4 | Comp. Example 5 |
|---|---|---|---|---|---|---|---|
| Skin material | Upper layer (S1) | Resin type | PET | PET | PET | PET | PET |
|  |  | Fiber size (μm) | 13 | 13 | 13 | 13 | 13 |
|  |  | Basis weight (g/m²) | 40 | 30 | 15 | 15 | 11.2 |
|  | Middle layer (M) | Resin type | — | PET | PET | PET | PET |
|  |  | Fiber size (μm) | — | 1.7 | 1.7 | 1.7 | 2 |
|  |  | Basis weight (g/m²) | — | 20 | 10 | 10 | 7.6 |
|  | Lower layer (S2) | Resin type | — | PET | PET | PET | PET |
|  |  | Fiber size (μm) | — | 13 | 13 | 13 | 13 |
|  |  | Basis weight (g/m²) | — | 30 | 15 | 15 | 11.2 |
|  | Filler content (g/m²) |  | 0 | 0 | 0 | 0 | 0 |
|  | Total basis weight (g/m²) |  | 40 | 80 | 40 | 40 | 30 |
|  | Partial thermocompression bonding rate (%) |  | 11 | 11 | 11 | 11 | 11 |
|  | Thickness (mm) |  | 0.21 | 0.23 | 0.21 | 0.21 | 0.16 |
|  | Bulk density (g/cm³) |  | 0.19 | 0.35 | 0.19 | 0.19 | 0.19 |
|  | Air permeability cc/cm²/sec) |  | 411 | 4 | 25 | 25 | 45 |
|  | Surface area per unit area (m²/m²) |  | 8.9 | 28.4 | 16.4 | 16.4 | 9.1 |
| Base material | Form |  | Felt | Urethane resin continuous foam | Glass wool | Urethane resin continuous foam | Felt |
|  | Thickness (mm) |  | 20 | 20 | 20 | 15 | 20 |
|  | Bulk density (g/cm³) |  | 0.070 | 0.016 | 0.050 | 0.016 | 0.070 |
|  | Basis weight (g/m²) |  | 1400 | 320 | 1000 | 240 | 1400 |
|  | Surface area per unit area (m²/m²) |  | 368 | 102 | 774 | 75 | 368 |
| Joining | Joining means |  | Resin | Resin | Resin | Resin | Resin |
|  | Basis weight (g/m²) |  | 10 | 10 | 10 | 10 | 10 |
| Composite sound-absorbing material | Basis weight (g/m²) |  | 1440 | 400 | 1050 | 290 | 1440 |
|  | Thickness (mm) |  | 20 | 20 | 20 | 20 | 20 |
|  | Bulk density (g/cm³) |  | 0.072 | 0.02 | 0.042 | 0.015 | 0.072 |
|  | Surface area ratio (skin material:base material) |  | 1:41 | 1:3.6 | 1:47 | 1:4.6 | 1:40 |
|  | Sound absorption (%) | Low frequency: 1000 Hz | 22 | 52 | 64 | 22 | 28 |
|  |  | Mid frequency: 2500 Hz | 57 | 80 | 80 | 86 | 93 |
|  |  | High frequency: 5000 Hz | 90 | 65 | 75 | 83 | 78 |
|  | Punching workability |  | F | F | F | F | P |

INDUSTRIAL APPLICABILITY

The composite sound-absorbing material of the invention has a small thickness while also exhibiting an excellent sound absorption property across a wide range including low frequency, mid frequency and high frequency, and can exhibit an adequate sound absorption effect even in the low-basis-weight region, and therefore it is particularly suitable for use as a composite sound-absorbing material in vehicles, domiciles, household electrical appliances and construction equipment.

The invention claimed is:

1. A composite sound-absorbing material composed of two or more layers including a base material and a skin material in which the skin material is disposed on an outermost layer, wherein a ratio of a surface area of the skin material per unit area ($m^2/m^2$) and a surface area of the base material per unit area ($m^2/m^2$) (skin material:base material) is at least 1:5 and less than 1:40, the surface area of the skin material per unit area is 10 $m^2/m^2$ to 20 $m^2/m^2$ and the surface area of the base material per unit area is 100 $m^2/m^2$ to 500 $m^2/m^2$.

2. The composite sound-absorbing material according to claim 1, wherein the ratio of the surface area of the skin material per unit area ($m^2/m^2$) and the surface area of the base material per unit area ($m^2/m^2$) (skin material:base material) is from 1:10 to 1:35.

3. The composite sound-absorbing material according to claim 1, wherein a thickness of the composite sound-absorbing material is 40 mm or smaller.

4. The composite sound-absorbing material according to claim 1, wherein a basis weight of the skin material is 25 $g/m^2$ to 70 $g/m^2$.

5. The composite sound-absorbing material according to claim 1, wherein the skin material is a nonwoven fabric integrated by thermocompression bonding.

6. The composite sound-absorbing material according to claim 5, wherein the thermocompression bonding is partial thermocompression bonding.

7. The composite sound-absorbing material according to claim 1, wherein the skin material is a nonwoven fabric in which at least one ultrafine fiber layer (M) with a mean fiber size of 0.3 μm to 7 μm and at least one thick fiber layer (S) with a mean fiber size of 10 μm to 30 μm are integrated.

8. The composite sound-absorbing material according to claim 7, wherein a basis weight of the ultrafine fiber layer (M) of the skin material is 1 $g/m^2$ to 40 $g/m^2$.

9. The composite sound-absorbing material according to claim 1, wherein the skin material comprises a filler that includes a synthetic resin at a content of 3 $g/m^2$ to 20 $g/m^2$.

10. The composite sound-absorbing material according to claim 1, wherein the base material is an open-cell resin foam.

11. The composite sound-absorbing material according to claim 1, wherein the base material is a fiber porous material.

12. The composite sound-absorbing material according to claim 1, wherein at least one layer of the skin material is disposed on a sound source side.

13. The composite sound-absorbing material according to claim 1, which has a sound absorption coefficient of 30% or greater at a frequency of 1000 Hz, a sound absorption coefficient of 90% or greater at 2500 Hz and a sound absorption coefficient of 80% or greater at 5000 Hz, for sound impinging from the skin material side as measured for normal incidence according to JIS A 1405.

* * * * *